Patented July 1, 1941

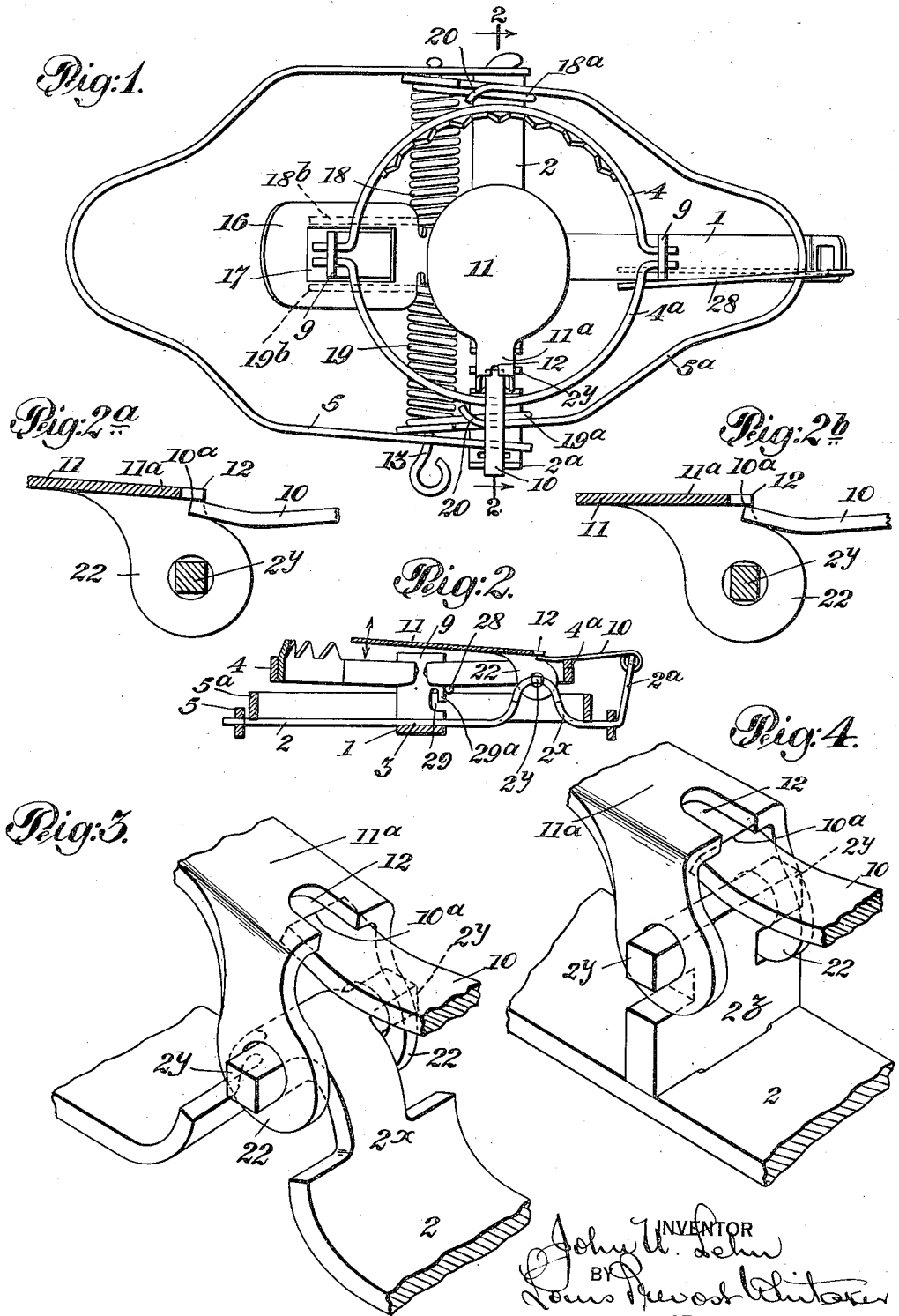

2,247,660

UNITED STATES PATENT OFFICE 2,247,660

ANIMAL TRAP

John U. Lehn, Lititz, Pa., assignor to Animal Trap Company of America, Lititz, Pa., a corporation of Pennsylvania Application September 23, 1939, Serial No. 296,229

3 Claims. (Cl. 43—92)

My invention consists in the novel features hereinafter described reference being had to the accompanying drawing which shows one form in which I have contemplated embodying my invention, selected by me for purposes of illustration, and the said invention is fully disclosed in the following description and claims.

In the manufacture and use of traps provided with opposed pivoted jaws, it is desirable to use, in connection with the usual latch, a treadle or pan provided with parallel perforated ears or lugs to pivotally engage projections integral with or attached to a portion of the frame as the so-called "cross", the integral trigger portion of the pan connecting said ears being engaged on the under side by the free end of the latch, when the trap is in set position. The extreme end of the latch is therefore concealed from view of the operator, and as the rocking of the pan on its pivotal connection changes the position of the trigger portion with respect to the latch, there is no way for the operator to determine the extent to which the trigger portion extends over the end of the latch. If it extends over the latch to a very considerable extent, the trap will not be sprung except by a very material downward movement of the pan. If the trigger extends a very slight distance over the latch, the trap will be sprung by a very slight depression of the pan. It is, of course, desirable to have the pan travel as little as possible before releasing the trap, since an animal reaching forward for a firm footing and touching the pan very lightly, will feel it move, and this will be a warning to it, so that if the pan must be moved a considerable distance before springing, the animal can sometimes withdraw its foot without completing the release of the jaws. If the trigger does not extend over the latch sufficiently, the trap may be sprung prematurely by a slight jar, with danger of injury to the operator.

In carrying out my invention, I provide the trigger portion of the pan, between the pivotal ears, with a recess disposed angularly to the pivotal axis of the pan and inwardly from the outer edge of the trigger portion, and of sufficient length to enable the edge of the latch which engages the trigger to be visible to the operator, throughout any normal relative movements of the trigger and latch. This enables the operator to see exactly how far the trigger extends over the latch and to determine accurately in setting the trap how far the trigger engaging portion of the latch is located from the end of the trigger when the trap is set. This accomplishes two important results. It prevents the premature springing of the trap while in the hands of the operator, or when placed in position in the trail of the animal which it is desired to catch, and enables the operator to set the trap so as to prevent excessive travel of the pan which would serve as a warning to the animal and prevent its being caught.

In the drawing I have illustrated my invention embodied in a trap of the type shown in Letters Patent No. 1,540,691, granted June 2, 1925, to W. A. Gibbs, but it is to be understood that it is equally applicable to any type of trap having opposed spring actuated jaws, with or without an auxiliary jaw or jaws to which a latch member and coacting pan may be applied.

In the accompanying drawing,

Fig. 1 is a plan view of a trap having my invention embodied therein, the parts being shown in set position.

Fig. 2 is a sectional view of the trap taken on line 2—2 of Fig. 1.

Fig. 2a is an enlarged detail view of portions of the latch and pan showing a substantial engagement of the latch and trigger, in set position.

Fig. 2b is a view similar to Fig. 2a showing the latch and trigger in relative positions to provide a set which may be sprung by a slight movement of the pan and yet without danger of a premature springing of the trap.

Fig. 3 is a detail perspective view showing portions of the cross, the pan pivotally connected thereto, and the latch, the parts being shown in the set position indicated in Fig. 2a.

Fig. 4 is a similar view to Fig. 3 showing a slightly different pivotal connection between the pan and cross, the parts being shown in the set position indicated in Fig. 2b.

As indicated in the drawing, the base or frame of the trap shown therein and selected by me for purposes of illustrating my present invention, comprises a longitudinal frame bar 1 and cross bar 2 (or cross as it is usually designated), riveted or otherwise secured together at 3, in the form of a cross. 4 and 4a are the primary opposed jaws pivotally mounted in brackets 9 on bar 1. 5 represents a fixed secondary jaw permanently secured to the cross 2, and 5a is the movable secondary jaw pivotally mounted on a pin 13, secured in this instance to the stationary jaw 5.

The primary jaws and the movable secondary jaw are actuated in this instance in a direction to close them, by coiled springs 18 and 19 which surround the pin 13, each spring having at its outer end an actuating arm, 18a and 19a respectively, in engagement with lugs 20 on the movable secondary jaw 5a, and at its inner end each spring is provided with an actuating arm engaging the under side of a closing arm for the primary jaws, as indicated in dotted lines at 18b and 19b, said closing arm being pivotally connected to the frame of the trap, and provided with an aperture 17 embracing the primary jaws, adjacent to their pivotal connections with the base, in the set position of the trap; and adapted to close the primary jaws when the trap is sprung.

11 represents the pan or treadle which is shown as being stamped out of sheet metal and provided with a shank 11a projecting therefrom, the outer end of which forms the trigger portion of the trap. Integral perforated ears or lugs 22 project downwardly at the opposite edges of the shank, 11a, and are pivoted to the cross 2 in any desired manner. As shown in Figs. 2 and 3, the cross is provided with an upwardly curved portion 2x cut away on opposite sides to form pivotal projections 2y to enter the apertures in the perforated ears 22. These ears can be formed so that they are separated sufficiently to permit their assembly with the pivotal projections 2y after which they can be bent inwardly into parallel position to prevent their accidental disassociation from said projections. In Fig. 4 I have shown the pivotal projections 2y formed on a separate piece 2z, which is riveted to a horizontal portion of the cross, but the operation of the trap is the same in both cases.

10 represents the latch for holding the jaws in set position. This latch is pivotally connected with the base or frame, preferably to an upturned end portion 2a of the cross, and has its free end bent slightly upward in this instance, as shown, so that its upper edge or corner 10a will engage the under surface of the trigger portion 11a of the pan, when the trap is set, and the latch will extend across one of the primary jaws (see Figs. 1 and 2), thus holding the closing arm 16 in set position and preventing the jaws from closing. Where the trap is provided with the auxiliary stationary and movable jaws as shown in Fig. 1, the latch 10 will also extend across the movable auxiliary jaw 5a, when the trap is set, thus holding all the movable jaws in set position.

In order that the operator may be able to accurately determine the amount of travel of the pan to release the trap and insure against a premature springing of the trap, I provide the trigger portion 11a of the pivoted pan 11 with a sight aperture, preferably in the form of an open slot 12 of less width than the latch, extending inwardly from the exterior edge of the trigger portion 11a of the pan, for a distance substantially corresponding to the normal limits of engagement of the edge 10a of the latch with the trigger portion 11a. This edge 10a will therefore extend across the aperture or slot 12, and will be clearly visible to the operator in setting the trap.

In setting the trap shown in Fig. 1 it is desirable to set the secondary jaw 5a first and lock it in set position before separating the primary jaws. For this purpose there is provided a temporary detent arm 28 which is pivotally connected with a bent-up end portion of the frame bar, and is constructed to lie over the secondary jaw 5a when in set position, and to engage a locking notch 29 formed in the adjacent pivotal support or bracket 9 for the primary jaws, as shown in Fig. 2. This slot has a horizontal entering, or open portion, communicating with a vertically extending portion, into which the detent arm is forced by the resistance of the secondary jaw. This form of slot provides a fixed depending arm of metal, indicated at 29a in Fig. 2, which depends above the mouth of the slot and prevents any possibility of the accidental release of the secondary jaw when set, and placed in charge of the detent arm 28. This detent arm is removed from engagement with the notch 29 when the trap is fully set, and preferably left under the primary jaw as a means of delaying the action of the auxiliary jaw until after the closing of the primary jaws.

After setting the secondary jaw and placing it in charge of the detent arm 28, the closing arm is depressed against the action of springs 18, 19, permitting the primary jaws to fall into horizontal position. The latch 10 is then thrown over the adjacent portions of the secondary jaw, 5a, and adjacent primary jaw 4a, and the pan is raised to bring the trigger portion on opposite sides of the aperture or slot 12 into engagement with the latch 10, so that the edge 10a of the upwardly bent end of the latch will engage said trigger.

As the inner edge 10a is visible to the operator through the sight aperture 12, the edge 10a of the latch 10 may be very accurately adjusted, as shown in Figs. 2b and 4, so that a very slight movement of the pan will be sufficient to spring the trap while at the same time the edge 10a will not be left so close to the outer end of the trigger portion as to permit an accidental springing of the trap while in the hands of the operator, which might result in injury to him or a premature springing of the trap after it is placed in position on the ground, which might result in the loss of the catch. It will be readily understood that if the edge 10a of the latch, when the trap is set, engages the trigger portion 11a at a greater distance than necessary from the outer end of the trigger portion, as indicated in Figs. 2a and 3 for example, it would require a greater downward movement of the pan 11 to release the trap which would result in a time element between the instant when the animal's foot first touched the pan and the time when the trap would be released, which would enable the animal to withdraw its foot and thus escape from the trap. It will thus be seen that by means of this sight aperture the correct and most desirable setting of the trap to secure the catch may be accurately determined.

What I claim and desire to secure by Letters Patent is:

1. In a trap provided with a base and pivotally mounted spring actuated opposed jaws, a pan having parallel ears, pivotally connected with the base, and a trigger portion between said ears, and a latch pivoted to said base, and having its free end adapted to engage the under surface of the trigger portion, said trigger portion being provided with a sight aperture of less width than the latch through which the trigger engaging portion of the latch may be viewed in setting the trap to predetermine the distance of the point of engagement of the latch with the trigger portion from the outer end of the latter, to regulate the distance of travel of the pan to effect the springing of the trap and to prevent premature and accidental springing thereof.

2. In a trap provided with a base and spring actuated opposed jaws pivotally connected with the base, a pan provided at one side with a shank having downwardly extending ears pivotally connected with the base, the portion of said shank between said ears forming a trigger, located above the pivotal connection of said ears, and a latch pivoted at one end to the base at a point in fixed relation to the pivotal axis of the pan, and having its free end engaging the lower face of said trigger, said trigger being provided with a sight aperture in the form of an open slot at its outer end through which the trigger engaging portion of the latch can be viewed in setting the trap to predetermine the distance of the point of engagement of the latch with the trigger portion from the outer end of the latter, to regulate the distance of travel of the pan to effect the springing of the trap and to prevent premature and accidental springing thereof.

3. In a trap provided with a base and spring actuated opposed jaws pivotally connected with the base, a pan provided at one side with a shank having downwardly extending ears pivotally connected with the base, the portion of said shank between said ears forming a trigger, located above the pivotal connection of said ears, and a latch, pivoted at one end to the base at a point in fixed relation to the pivotal axis of the pan, and having its free end bent upwardly and provided with an angular transverse edge to engage the under surface of the trigger, said trigger being provided with a sight aperture extending inwardly from its outer edge, perpendicularly to the pivotal axis of the pan, of a length substantially equal to the normal range of engagement of the latch with the trigger, through which aperture the trigger engaging portion of the latch can be viewed in setting the trap, to regulate the extent of travel of the pan in releasing the trap by moving said pan upon its pivotal connection, and preventing premature and accidental springing of the trap.

JOHN U. LEHN.